United States Patent
Bergkamp et al.

(10) Patent No.: US 10,427,814 B2
(45) Date of Patent: Oct. 1, 2019

(54) CONTINUOUS ROTARY WIRE TIE ASSEMBLY

(71) Applicant: ACCENT PACKAGING, INC., Tomball, TX (US)

(72) Inventors: Alan Bergkamp, Hutchinson, KS (US); Mark A Vaughn, Wyandotte, OK (US)

(73) Assignee: Accent Packaging, Inc., Tomball, TX (US)

( * ) Notice: Subject to any disclaimer, the term of this patent is extended or adjusted under 35 U.S.C. 154(b) by 565 days.

(21) Appl. No.: 15/164,603

(22) Filed: May 25, 2016

(65) Prior Publication Data

US 2017/0341788 A1 Nov. 30, 2017

(51) Int. Cl.
*B65B 13/28* (2006.01)
*F16H 1/20* (2006.01)
*B65B 13/18* (2006.01)
*B65B 65/02* (2006.01)

(52) U.S. Cl.
CPC ............ *B65B 13/285* (2013.01); *B65B 13/18* (2013.01); *B65B 13/185* (2013.01); *B65B 65/02* (2013.01); *F16H 1/20* (2013.01)

(58) Field of Classification Search
CPC ......... B21F 7/00; B65B 13/18; B65B 13/185; B65B 13/285; B65B 65/02; B65B 13/187
USPC ...................... 100/4, 29, 31; 140/93.2, 93.6
See application file for complete search history.

(56) References Cited

U.S. PATENT DOCUMENTS

| 9,676,505 B2 * | 6/2017 | Robinson ................ B65B 13/04 |
| 2005/0229997 A1 | 10/2005 | Wiedel |
| 2012/0055578 A1 * | 3/2012 | Kodi ......................... B21F 7/00 140/149 |

FOREIGN PATENT DOCUMENTS

| GB | 219065 | 7/1924 |
| GB | 480312 | 2/1938 |
| GB | 684509 | 12/1952 |
| JP | 04-092144 | 3/1992 |
| JP | 2004-123374 | 4/2004 |
| JP | 2015-18040 | 1/2015 |
| WO | WO 2015-138322 | 9/2015 |

\* cited by examiner

*Primary Examiner* — Debra M Sullivan
(74) *Attorney, Agent, or Firm* — Ira Domnitz

(57) ABSTRACT

A wire tie assembly and method of tying a wire using the wire tie assembly is provided. Embodiments of the wire tie assembly comprise a gear-train having a main-drive gear continuously driven by a motor, an idler gear having a first and second dwell portions, the idler gear being configured to mesh with the main-drive gear during a portion of the wire-tying cycle and to dwell relative to the main-drive gear during a portion of the wire-tying cycle, and a twister pinion gear having a wire receiving channel and configured to be in mesh with the idler gear during a portion of the wire tying cycle and to dwell relative to the idler gear during a portion of the wire tying cycle. Some embodiments include cam pins coupled to the idler gear and cam followers that engage the cam pins to actuate secondary functions of the wire tying cycle.

26 Claims, 14 Drawing Sheets

CONTINUOUS ROTARY WIRE TIE ASSEMBLY

STATEMENT REGARDING FEDERALLY SPONSORED RESEARCH OR DEVELOPMENT

Not applicable.

TECHNICAL FIELD

Embodiments of the present invention relate to a continuous rotary wire tie assembly for use with a strapping machine for baling materials. More particularly, embodiments of the present invention relate to a continuous rotary wire tie assembly for tying a wire that has been applied to a bale by the strapping machine.

BACKGROUND OF THE INVENTION

Traditional bulk-material baling machines incorporate a tying system for securing the baled material. Some previous tying systems have been driven by an extending and retracting drive element, such as a hydraulic arm. A wire is tied by such tying systems as the drive element is extended. After the wire is tied, the drive element is retracted to reset the tying system. Retracting the drive element to reset the tying system, however, results in wasted energy and unnecessary wear on the components of the tying system.

Other tying systems have used gears to turn a wire twister, but have had to rely on clutch mechanisms to engage and disengage such gears from the power transmission of a drive element in order to stop turning the wire twister during portions of a tying cycle. The clutch mechanisms of such tying systems add additional wear parts that must be replaced when spent, causing the tying system to be taken out of operation during replacement.

Accordingly, embodiments of the present invention introduce technology for resolving the above-mentioned issues conventionally experienced when tying a wire in bulk-material baling systems.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects herein are directed towards a wire tie assembly having a gear-train that may be driven continuously in the same direction throughout a wire tying cycle, without the need to be driven in reverse to reset the wire tie assembly for a subsequent wire tying cycle. The wire tie assembly may include a gear-train having a main-drive gear continuously driven in a first direction by a motor, an idler gear in mesh with the main-drive gear and able to dwell (i.e., not turn) relative to the main-drive gear during a portion of the wire tying cycle, and a twister pinion gear in mesh with the idler gear and able to dwell relative to the idler gear during a portion of the wire tying cycle. The idler gear may dwell relative to the main-drive gear when a first dwell portion of the idler gear, having gear teeth with reduced face width, is rotated adjacent the main-drive gear. The twister pinion gear may dwell relative to the idler gear when a dwell cam affixed to the idler gear is slidably received by a radial dwell land of the twister pinion gear. In some aspects, the idler gear may include one or more cam pins that are configured to interact with one or more cam followers to perform a variety of secondary functions, such as opening a door, cutting the wire, ejecting the wire, and locking the idler gear and the twister pinion gear in a home position.

In a first exemplary aspect, embodiments of the invention are directed to a gear-train for driving a wire tying device and may include a main-drive gear configured to be continuously driven in a first direction throughout the duration of a wire tying cycle. The gear-train may also include an idler gear having a first dwell portion and a second dwell portion. The idler gear may be configured to mesh with the main-drive gear during a portion of the wire-tying cycle, and to dwell relative to the main-drive gear during a portion of the wire-tying cycle when the first dwell portion is adjacent to the main-drive gear. The gear-train may also include a twister pinion gear having a wire receiving channel. The twister pinion gear may be configured to be in mesh with the idler gear during a portion of the wire tying cycle and to dwell relative to the idler gear during a portion of the wire tying cycle, when the second dwell portion is adjacent to the twister pinion gear.

In a second exemplary aspect, embodiments of the invention are directed to a wire tie assembly for tying a wire positioned around a material to be baled and may include a main-drive gear shaft having a plurality of main-drive gear teeth, at least one dwell recovery tooth, and a cam lobe coupled to the main-drive gear shaft. The main-drive gear shaft may be rotatably coupled to a frame. The assembly further includes an idler gear that may have a plurality of idler teeth, at least one first dwell tooth, at least one second dwell tooth, one or more cam pins, and a dwell cam axially spaced from the at least one second dwell tooth. The idler gear may be rotatably coupled to the frame and positioned to mesh with the main-drive gear shaft. A core assembly is coupled to the frame. The core assembly may have a twister pinion gear rotatably coupled thereto. The twister pinion gear may have a wire receiving slot, a plurality of twister pinion teeth, and a radial dwell land formed in one or more of the twister pinion teeth. The twister pinion gear may be positioned to mesh with the idler gear. A motor may be coupled to the main-drive gear shaft and configured to continuously drive the main-drive gear shaft in a first direction throughout the duration of a wire tying cycle.

In a third exemplary aspect, embodiments of the invention are directed to a method of tying a wire positioned around a material to be baled with a wire tie assembly. The method may comprise rotating an idler gear and a twister pinion gear to twist a wire received in a wire receiving channel of the twister pinion gear, cutting the wire, causing the twister pinion gear to dwell relative to the idler gear in a position where the wire receiving channel is aligned with a wire ejection slot of the wire tie assembly, ejecting the wire from the wire receiving channel, rotating the idler gear and the twister pinion gear to a home position, and causing the idler gear to dwell at the home position.

Additional objects, advantages, and novel features of the invention will be set forth in part in the description that follows, and in part will become apparent to those skilled in the art upon examination of the following, or may be learned by practice of the invention.

BRIEF DESCRIPTION OF SEVERAL VIEWS OF THE DRAWINGS

The present invention is described in detail below with reference to the attached drawing figures, wherein.

DETAILED DESCRIPTION OF THE INVENTION

Figure 1:
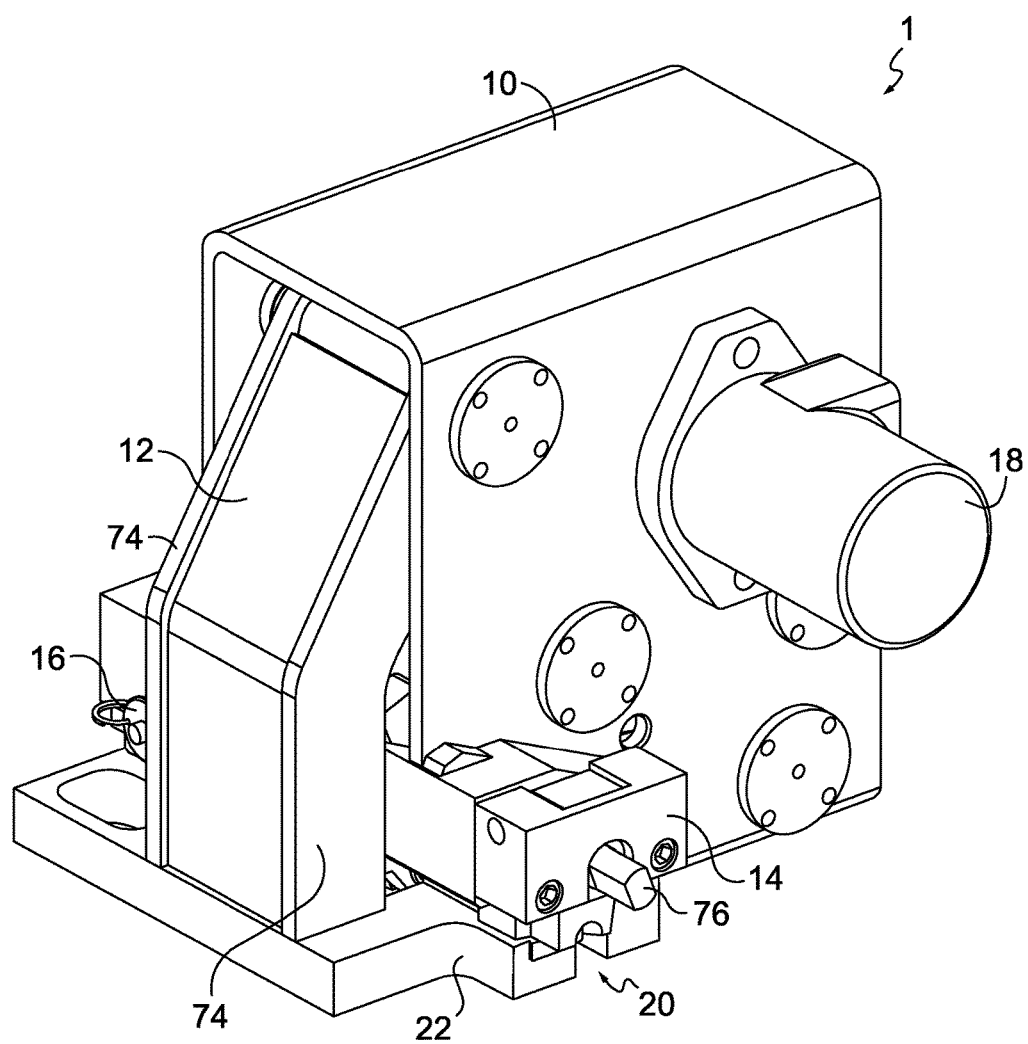
FIG. 1 is a perspective view of an exemplary wire tie assembly, in accordance with an embodiment of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed, unless and except when the order of individual steps is explicitly stated.

As used throughout this disclosure, the term "dwell" means to hold position and not move relative to an adjacent gear.

At a high level, aspects herein are directed towards a wire tie assembly having a gear-train that may be driven continuously in one direction throughout a wire tying cycle, without the need to be driven in reverse to reset the wire tie assembly for a subsequent wire tying cycle. The wire tie assembly may include a gear-train having a main-drive gear continuously driven in a first direction by a motor, an idler gear in mesh with the main-drive gear and able to dwell (i.e., not turn) relative to the main-drive gear during a portion of the wire tying cycle, and a twister pinion gear in mesh with the idler gear and able to dwell relative to the idler gear during a portion of the wire tying cycle. The idler gear may dwell relative to the main-drive gear when a first dwell portion of the idler gear, having gear teeth with reduced face width, is rotated adjacent the main-drive gear. The twister pinion gear may dwell relative to the idler gear when a dwell cam affixed to the idler gear is slidably received by a radial dwell land of the twister pinion gear. In some aspects, the idler gear may include one or more cam pins that are configured to interact with one or more cam followers to perform a variety of secondary functions, such as opening a door, cutting the wire, ejecting the wire, and locking the idler gear and the twister pinion gear in a home position.

In a first exemplary aspect, embodiments of the invention are directed to a gear-train for driving a wire tying device and may include a main-drive gear configured to be continuously driven in a first direction throughout the duration of a wire tying cycle. The gear-train may also include an idler gear having a first dwell portion and a second dwell portion. The idler gear may be configured to mesh with the main-drive gear during a portion of the wire tying cycle, and to dwell relative to the main-drive gear during a portion of the wire tying cycle when the first dwell portion is adjacent to the main-drive gear. The gear-train may also include a twister pinion gear having a wire receiving channel. The twister pinion gear may be configured to be in mesh with the idler gear during a portion of the wire tying cycle and to dwell relative to the idler gear during a portion of the wire tying cycle, when the second dwell portion is adjacent to the twister pinion gear.

In some aspects, the main-drive gear may comprise a spur gear shaft and the gear-train may further comprise a plurality of spur gear teeth radially extending from a portion of the spur gear shaft. The gear-train may also include a cam coupled to the spur gear shaft and spaced apart from the plurality of spur gear teeth. In further aspects, the cam may be configured to release the gear-train from a dog.

The gear-train may further comprise one or more dwell recovery teeth extending from the main drive-gear and configured to re-engage the idler gear when the idler gear enters a dwell relative to the main-drive gear. The first dwell portion may comprise one or more first gear teeth having a reduced face width and may be configured to engage only the one or more dwell recovery teeth of the main-drive gear. The main-drive gear may be continuously driven by a motor.

In other aspects, the gear-train may further comprise the twister pinion gear having a plurality of twister pinion gear teeth. The second dwell portion may include one or more second gear teeth having a reduced face width that may be configured to permit the twister pinion gear teeth to freely pass beside the one or more second gear teeth. The gear-train may further comprise a dwell cam coupled to the idler gear adjacent the second dwell portion and opposite the one or more second gear teeth. The twister pinion gear may have one or more dwell teeth configured to slidably engage the dwell cam and cause the twister pinion gear to dwell relative to the idler gear. In some aspects, the gear-train may further include a radial dwell land formed in the one or more dwell teeth.

The gear-train may include at least one of a first cam pin coupled to the idler gear and configured to actuate a door during a portion of the wire tying cycle, a second cam pin coupled to the idler gear and configured to actuate a wire cutter during a portion of the wire tying cycle, a third cam pin coupled to the idler gear and configured to actuate a wire ejector during a portion of the wire tying cycle, and a detent pin coupled to the idler gear and configured to be held by a dog to lock the idler gear in a home position. In some aspects, the home position may correspond to the first dwell portion rotating to a position adjacent the main-drive gear and the twister pinion gear being rotated such that the wire receiving channel is not radially aligned with a wire ejection slot of the wire tying device. In other aspects, the center point of each of the main-drive gear, the idler gear, and the twister pinion gear may be linearly aligned.

In a second exemplary aspect, embodiments of the invention are directed to a wire tie assembly for tying a wire positioned around a material to be baled and may include a main-drive gear shaft having a plurality of main-drive gear teeth, at least one dwell recovery tooth, and a cam lobe coupled to the main-drive gear shaft. The main-drive gear shaft may be rotatably coupled to a frame. The assembly further includes an idler gear that may have a plurality of idler teeth, at least one first dwell tooth, at least one second dwell tooth, one or more cam pins, and a dwell cam axially spaced from the at least one second dwell tooth. The idler gear may be rotatably coupled to the frame and positioned to mesh with the main-drive gear shaft. A core assembly is coupled to the frame. The core assembly may have a twister pinion gear rotatably coupled thereto. The twister pinion gear may have a wire receiving slot, a plurality of twister pinion teeth, and a radial dwell land formed in one or more of the twister pinion teeth. The twister pinion gear may be positioned to mesh with the idler gear. A motor may be coupled to the main-drive gear shaft and configured to continuously drive the main-drive gear shaft in a first direction throughout the duration of a wire tying cycle.

In some aspects, only a portion of each of the plurality of main-drive gear teeth may mesh with the plurality of idler gear teeth and that portion may have a smaller face width than the face width of the plurality of idler gear teeth. In other aspects, the at least one dwell recovery tooth may include one of the plurality of main-drive gear teeth having a meshing portion with a wider face width than the other main-drive gear teeth. In still other aspects, the at least one dwell recovery tooth may include a gear tooth spaced apart and axially aligned with one of the plurality of main-drive gear teeth.

The frame of the wire tie assembly may also include one or more of a dog rotatably coupled to the frame, a wire ejector cam follower rotatably coupled to the frame, a wire gripper, a door having a cover plate and configured to move between an open position and a closed position, and a door opening cam follower, in accordance with aspects described herein. The cam lobe may actuate the dog to release the idler gear and the twister pinion gear from the home position and initiate the wire tying cycle. In some aspects, the door may be rotatably coupled to the frame such that the door rotates between the open position and the closed position. In other aspects, the door may be slidably affixed to the core assembly such that the door slides between the open position and the closed position. The door may be biased to return to the closed position.

A face width of the at least one second dwell tooth may be smaller than a face width of the plurality of idler teeth. The idler gear may include a first side opposite a second side and the at least one second dwell tooth may be positioned adjacent to the first side. The dwell cam may be positioned adjacent to the second side and may be axially aligned with the at least one second dwell tooth. The dwell cam and the at least one second dwell tooth may define a channel there-between along a channel land of the idler gear. In some aspects, a face width of the twister pinion teeth may be smaller than a face width of the plurality of idler teeth.

In other aspects, the wire tie assembly may also include the core assembly having a wire cutter coupled to a cam follower and configured to cut the wire when the cam follower is engaged by one of the one or more cam pins. The core assembly may include a wire ejection slot and the radial dwell land may be configured to engage the dwell cam while the wire receiving channel is aligned with the wire ejection slot.

In a third exemplary aspect, embodiments of the invention are directed to a method of tying a wire positioned around a material to be baled with a wire tie assembly. The method may comprise rotating an idler gear and a twister pinion gear to twist a wire received in a wire receiving channel of the twister pinion gear, cutting the wire, causing the twister pinion gear to dwell relative to the idler gear in a position where the wire receiving channel is aligned with a wire ejection slot of the wire tie assembly, ejecting the wire from the wire receiving channel, rotating the idler gear and the twister pinion gear to a home position, and causing the idler gear to dwell at the home position. The rotation of the idler gear and the twister pinion gear to twist the wire may begin at the home position, in accordance with some aspects. The idler gear may dwell relative to the main-drive gear shaft at the home position.

In some aspects, the method of tying a wire may further comprise continuously rotating a main-drive gear shaft in a first direction throughout the duration of a wire tying cycle and engaging one or more dwell recovery teeth of the main-drive gear shaft with one or more first dwell teeth of the idler gear. In other aspects, the method of tying a wire may further comprise releasing the idler gear from a dog, opening a wire retaining door, closing a wire retaining door, and locking the idler gear in the home position during its dwell relative to the main-drive gear shaft with the dog. The twister pinion gear may dwell relative to the idler gear when a radial dwell land formed in one or more teeth of the twister pinion gear is slidably received by a dwell cam coupled to the idler gear.

With reference now to FIG. 1, an embodiment of a wire tie assembly 1 may include a frame 10 housing multiple components therein and to which multiple components may be coupled. The wire tie assembly 1 may be one component of a baling machine. For example, a baling machine may include an inlet hopper, a first ram for compressing the material to be baled, a second ram for ejecting the baled material, a bale outlet, and a wire tying system disposed around the bale outlet. An exemplary wire tying system may include a pinch-roll mechanism, a spring-loaded, separable wire guide track disposed around the bale outlet, along with the wire tie assembly 1. Baling machines may include any number of other assemblies, as well.

The frame 10 may include a door 12 secured thereto. The illustrated door 12 is rotatably coupled to the frame 10 and may move between a closed position (as shown in FIG. 1) and an open position (not shown). In other aspects, the door 12 may be slidably coupled to the frame 10 or a core assembly 14 and may move between the closed position and the open position. The door 12 may be biased to return to the closed position. For example, a spring may be employed to pull the door 12 towards the closed position. The door 12 may provide access to the components housed within the frame 10. The door 12 may also include a channel plate cover 22 that helps maintain a received wire in the wire tie assembly 1.

The core assembly 14 may also be coupled to the frame 10. In some aspects, the core assembly 14 may be received within a pair of slots formed in the frame 10 and coupled to the frame 10 by a locking pin 16. Aspects having a single coupling, such as the locking pin 16, between the core assembly 14 and the frame 10 provide for easy removal of the core assembly 14 when maintenance is required.

A mechanical energy supply may be coupled to the frame 10 to provide a mechanical energy input into the wire tie assembly 1. For example, the mechanical energy supply may comprise an electric motor 18 or an engine (not shown).

The wire tie assembly 1 may be positioned proximate to a wire guide track and may include a wire feed opening 20 for receiving a wire therethrough. In some aspects, the wire feed opening 20 may communicate with a wire passageway extending through the wire tie assembly 1. For example, the core assembly 14 may include a wire ejection slot 88 (shown in FIG. 13) on the bottom thereof and the passageway may be formed when the channel cover plate 22 encloses the wire ejection slot 88. In one aspect, the channel cover plate 22 is affixed to the door 12 and may enclose the wire ejection slot 88 when the door 12 is in the closed position. In such aspect, when the door 12 is moved to the open position, the channel cover plate 22 also moves and exposes the wire ejection slot 88, which is useful when ejecting a tied wire from the wire tie assembly 1.

Figure 10:
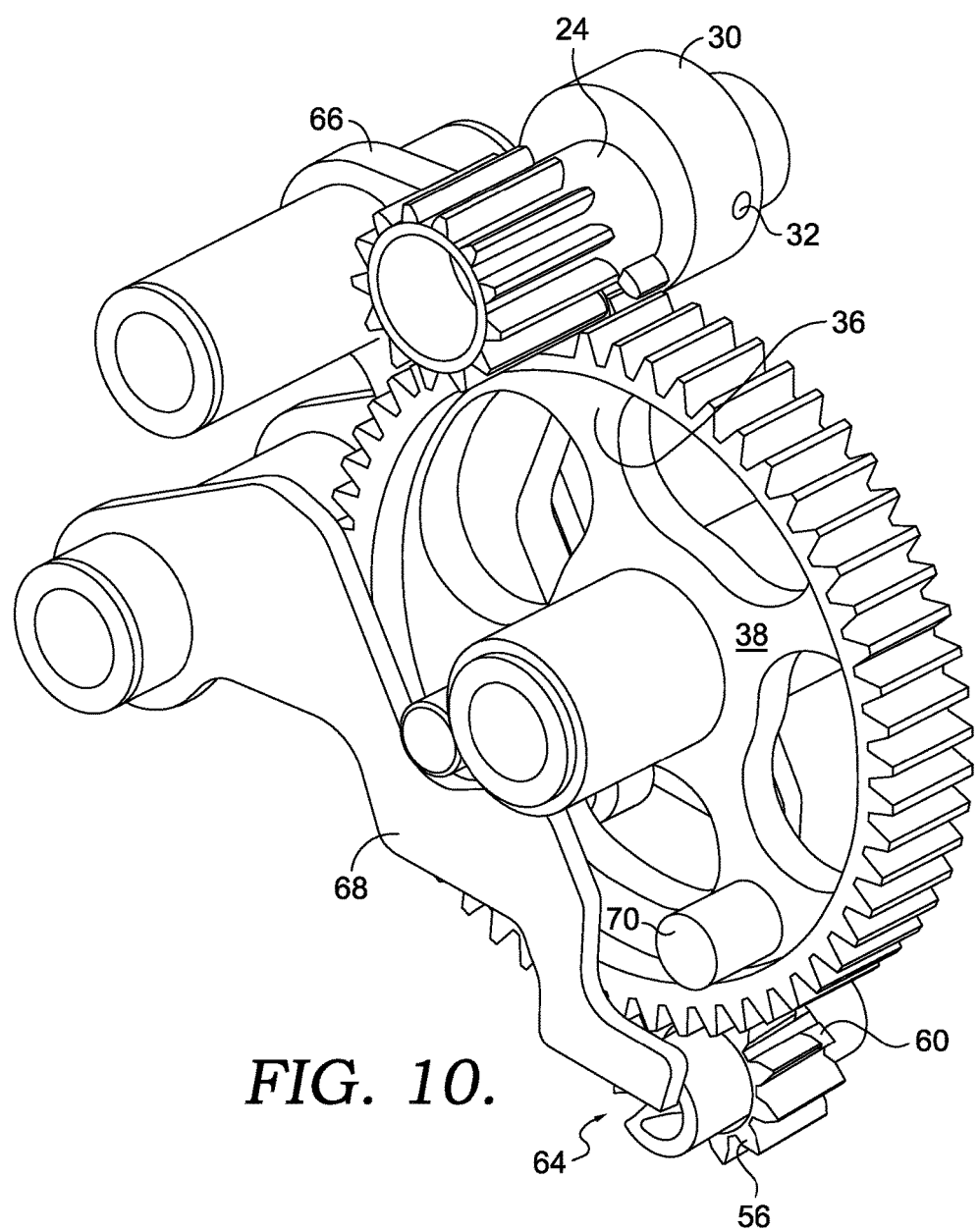
FIG. 10 is a partial perspective view from within the frame of a first side of the wire tie assembly of FIG. 1, in accordance with an embodiment of the invention.

As shown, for example, in FIG. 10, the wire tie assembly 1 may include a gear-train housed within the frame 10. Generally, the gear-train may include a main-drive gear 24, an idler gear 36, and a twister pinion gear 56. Each of these gears may be rotatably coupled to a shaft, may be secured to a shaft and the shaft may be rotatably coupled to the frame 10 or another portion of the wire tie assembly 1 (such as the core assembly 14), or may be integral to a gear shaft and the gear shaft may be rotatably coupled to the frame 10 or another portion of the wire tie assembly 1 (such as the core assembly 14 or the motor 18).

Figure 2:
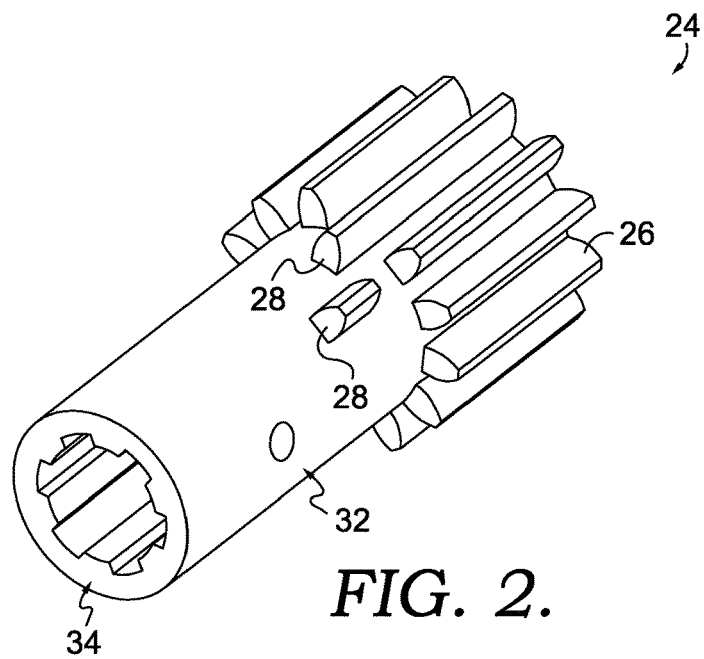
FIG. 2 is a perspective view of a main-drive gear, in accordance with an embodiment of the invention.

Turning now to FIGS. 2-5, the components of an exemplary gear-train will now be discussed. FIG. 2 illustrates one aspect of the main-drive gear 24 wherein the main-drive gear 24 is integral to a gear shaft to form a main-drive gear shaft. The main-drive gear shaft may include a plurality of main-drive gear teeth 26 radially extending therefrom, at least one dwell recovery tooth 28, a cam lobe 30 (as shown in FIG. 10), a cam lobe coupling 32, and a mechanical coupling 34. The illustrated main-drive gear 24 includes thirteen main-drive gear teeth 26. In one aspect, the at least one dwell recovery tooth 28 may comprise an extended portion of one of the plurality of main-drive gear teeth 26 where said main-drive gear tooth has an extended face width. In another aspect, the at least one dwell recovery tooth 28 may also comprise a separated gear tooth spaced apart from, and axially aligned with, one of the plurality of main-drive gear teeth 26. In the illustrated aspect, the main-drive gear 24 includes thirteen main-drive gear teeth 26 and two dwell recovery teeth 28, one of each type described above.

In some aspects, the motor 18 may be coupled to the main-drive gear 24. For example, the main-drive gear shaft may be coupled to the motor 18 at the mechanical coupling 34. The main-drive gear 24 is configured to be continuously turned in a first direction by the motor 18 throughout the duration of a wire tying cycle, in accordance with some aspects. The main-drive gear 24 may be continuously turned in the first direction for a subsequent wire tying cycle after a first wire tying cycle. In some aspects, the main-drive gear 24 may be turned continuously in the first direction for a plurality of wire tying cycles. In other words, the main-drive gear 24 may be continuously rotated in one direction and need not be turned backwards to reset its position before a subsequent wire tying cycle may commence.

Figure 3:
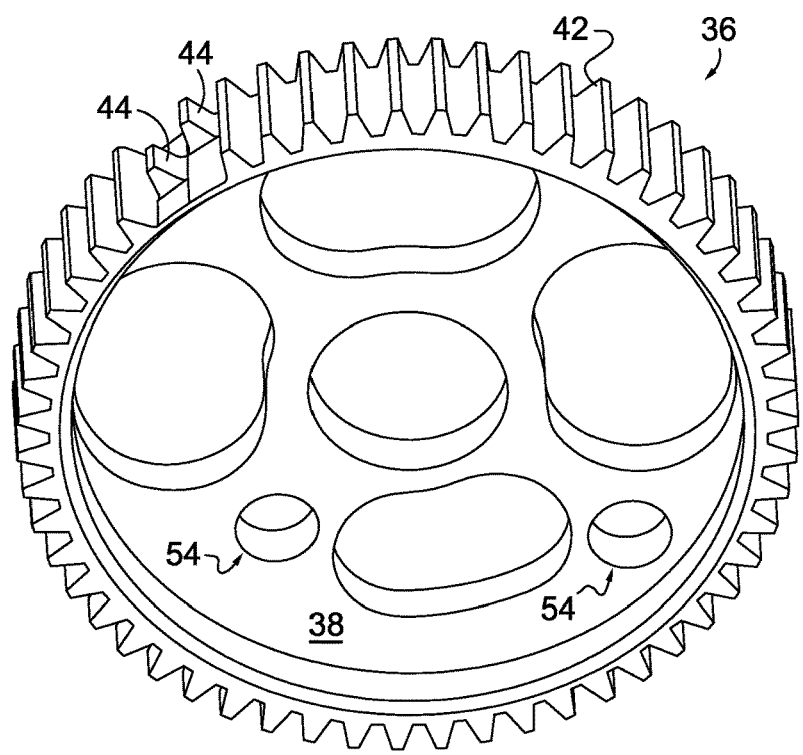
FIG. 3 is a perspective view of a first side of an idler gear, in accordance with an embodiment of the invention.
Figure 4:
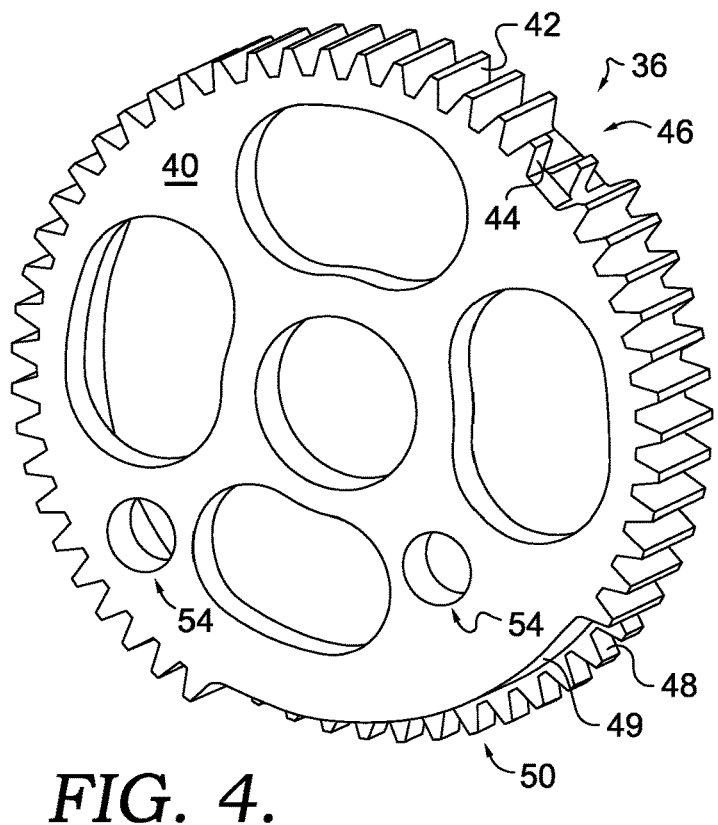
FIG. 4 is a perspective view of a second side of an idler gear, in accordance with an embodiment of the invention.

FIGS. 3-4 illustrate one aspect of the idler gear 36. The idler gear 36 may have a first side 38 (shown in FIG. 3) opposite a second side 40 (shown in FIG. 4). The idler gear 36 may include a plurality of idler teeth 42, at least one first dwell tooth 44, a first dwell portion 46, at least one second dwell tooth 48, and a second dwell portion 50. The illustrated idler gear 36 includes fifty-five teeth, wherein the plurality of idler teeth 42 comprise forty-one teeth, the at least one first dwell tooth 44 comprises two teeth, and the at least one second dwell tooth 48 comprises twelve teeth.

The at least one first dwell tooth 44 may have a face width smaller than the face width of the plurality of idler teeth 42. For example, the illustrated aspect has two first dwell teeth 44, each having a face width approximately one-third as wide as the face width of the other idler teeth 42. Further, the two first dwell teeth 44 of the illustrated aspect are spaced axially such that one is adjacent to the second side 40 and one is centered on the idler gear 36. This results in the illustrated aspect not having a first dwell tooth 44 adjacent the first side 38. In some aspects, the at least one first dwell tooth 44 only meshes with the main-drive gear 24 at the at least one dwell recovery tooth 28. For example, in some aspects, only a portion adjacent the first side 38 of each of the plurality of idler teeth 42 may be in mesh with the plurality of main-drive gear teeth 26. The first dwell portion 46 may comprise the portion of the idler gear 36 not in mesh with the plurality of main-drive gear teeth 26 of the main-drive gear 24. Hence, the first dwell portion 46 may comprise the portion of the idler gear 36 having the at least one first dwell tooth 44.

Figure 14:
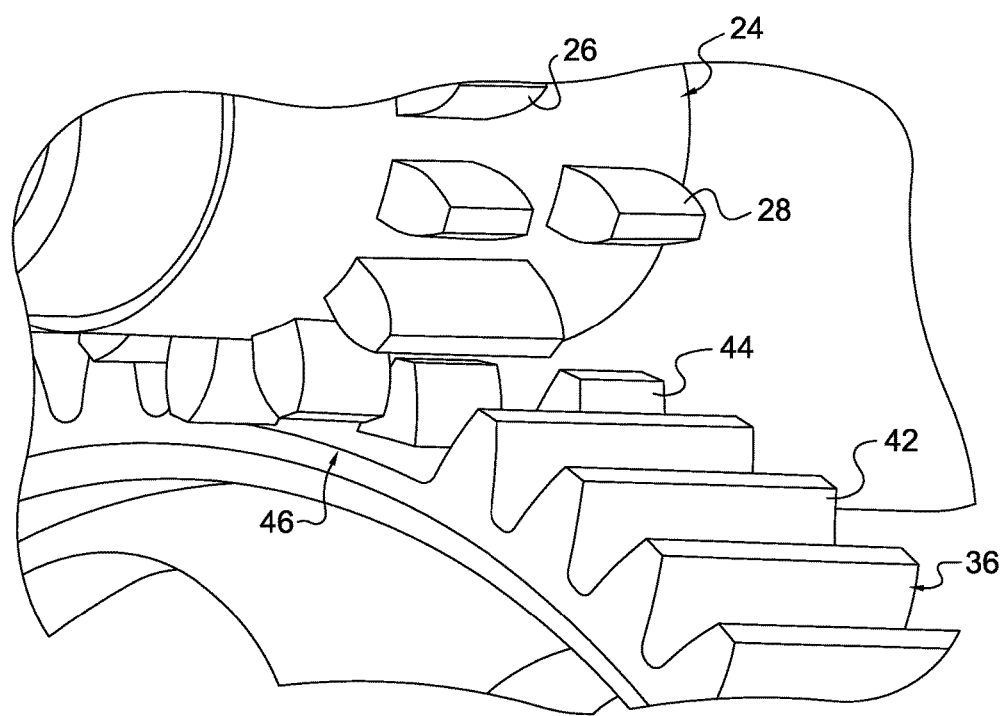
FIG. 14 is a detail view of a first dwell portion, in accordance with an embodiment of the invention.
Figure 15:
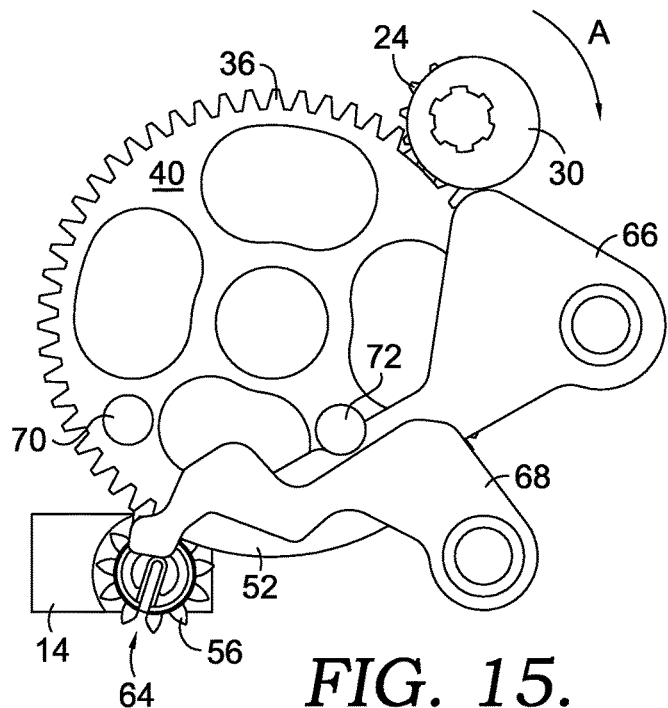
FIG. 15 is a partial side view of a wire tie assembly, in accordance with an embodiment of the invention.

The idler gear 36 may dwell relative to the main-drive gear 24 when the first dwell portion 46 rotates adjacent to the main-drive gear 24. When this occurs, the idler gear 36 loses its mesh with the main-drive gear 24 because there are no teeth for the plurality of main-drive gear teeth 26 to engage (as shown in FIG. 14). The idler gear 36 will continue to dwell relative to the main-drive gear 24 and the main-drive gear 24 may continue to turn in the first direction until the at least one dwell recovery tooth 28 engages the at least one first dwell tooth 44. In some aspects, the main-drive gear 24 may turn at least two hundred seventy degrees before the at least one dwell recovery tooth 28 engages the at least one first dwell tooth 44. This dwell of the idler gear 36 relative to the main-drive gear 24 may allow another segment of wire to be advanced around the wire-guide track and be received by the wire tie assembly 1 before a subsequent wire tying cycle begins. The dwell of the idler gear 36 relative to the main-drive gear 24 also may allow an operator time to stop the baling machine before a new segment of wire is tied by the wire tie assembly 1.

The at least one second dwell tooth 48 may have a face width smaller than the face width of the plurality of idler teeth 42. For example, the illustrated at least one second dwell tooth 48 has a face width approximately one-third as wide as the face width of the plurality of idler teeth 42.

Further, the twelve first dwell teeth 48 of the illustrated aspect are each spaced axially to be adjacent the first side 38. This results in the illustrated aspect not having a second dwell tooth 48 adjacent the second side 40. The portion between the at least one second dwell tooth 48 and the second side 40 comprises a channel land 49. The second dwell portion 50 may be the portion of the idler gear 36 adjacent the at least one second dwell tooth 48. In some aspects, a dwell cam 52 may be coupled to the second side 40. In these aspects, the dwell cam 52 (shown in FIG. 9) and the at least one second dwell tooth 48 across the channel land 49 define a dwell channel 53 (shown in FIG. 8). The second dwell portion 50 may cause the twister pinion gear 56 to dwell relative to the idler gear 36 as more fully explained below. In aspects, the main-drive gear 24 may continue to drive the idler gear 36 when the twister pinion gear 56 enters a dwell relative to the idler gear 36.

Figure 11:
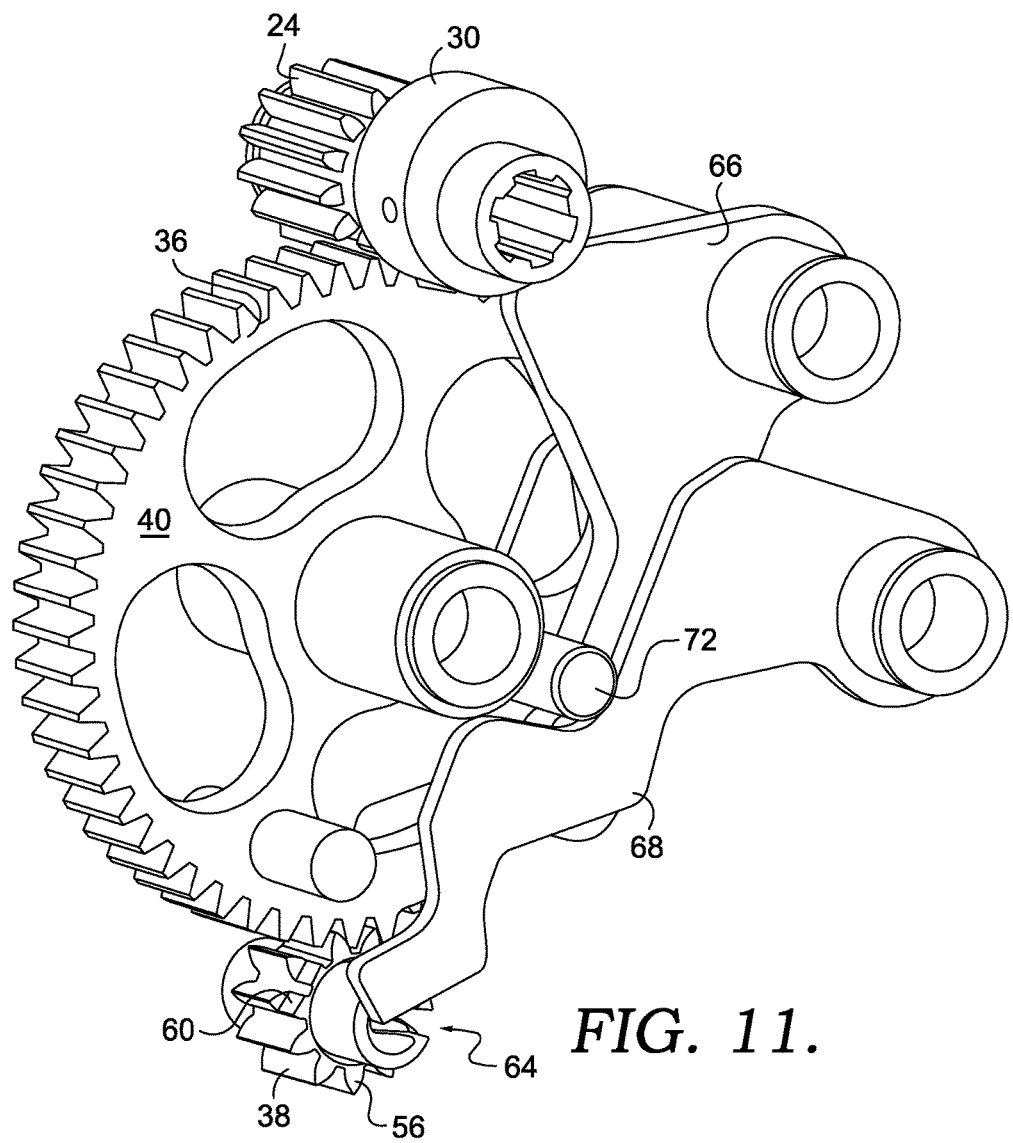
FIG. 11 is a partial perspective view from within the frame of a second side of the wire tie assembly of FIG. 1, in accordance with an embodiment of the invention.
Figure 12:
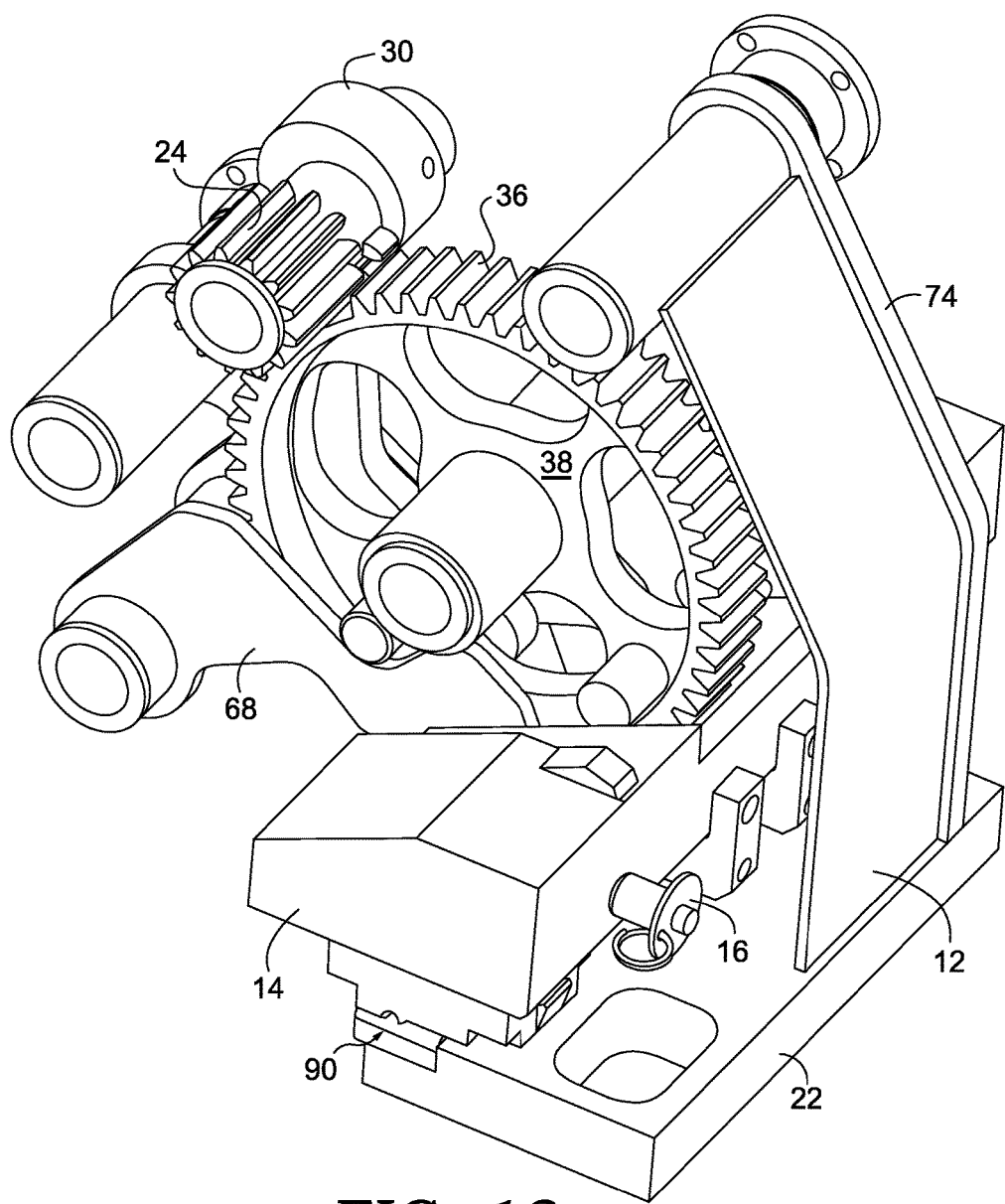
FIG. 12 is a partial perspective view from within the frame of a first side of the wire tie assembly of FIG. 1, in accordance with an embodiment of the invention.

In further aspects, the idler gear 36 may include one or more cam pin couplings 54. Each of the cam pin couplings 54 may receive one or more cam pins 70 therein (as shown in FIGS. 10-12). The continued turning motion of the idler gear 36 after twister pinion gear 56 enters a dwell relative to the idler gear 36 may permit the one or more cam pins 70 to actuate secondary functions related to the wire tying cycle while the twisted wire is held in a stationary position.

Figure 5:
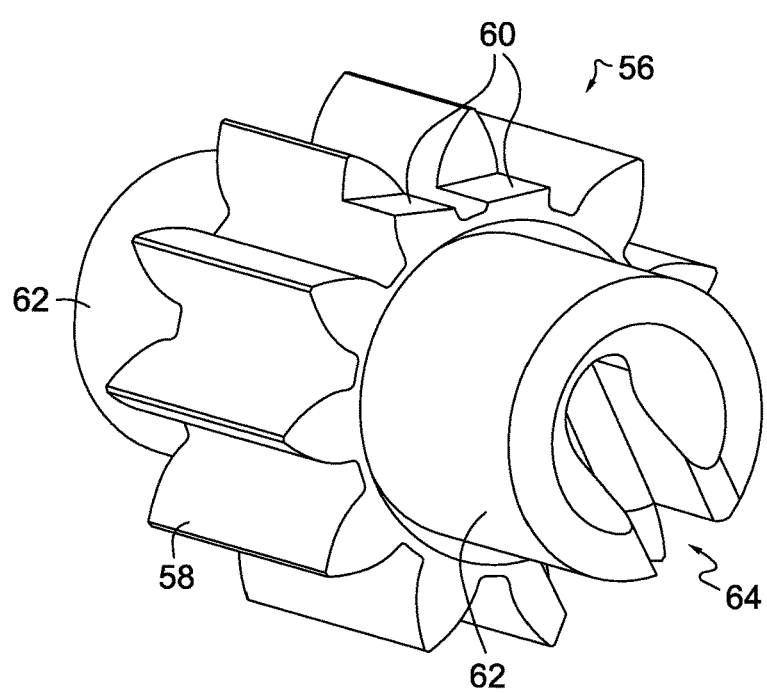
FIG. 5 is a perspective view of a twister pinion gear, in accordance with an embodiment of the invention.

Turning now to FIG. 5, one aspect of the twister pinion gear 56 is illustrated having a plurality of twister pinion teeth 58, a radial dwell land 60 formed in two of the twister pinion teeth 58, a pair of twister pinion arms 62 journaled axially away from each side of the twister pinion teeth 58, and a wire receiving channel 64. In the illustrated aspect, the plurality of twister pinion teeth 58 comprise eleven teeth. The radial dwell land 60 may be formed in one or more of the plurality of twister pinion teeth 58. In some aspects, the radial dwell land 60 may be formed on an edge of the one or more twister pinion teeth 58. In other aspects, the radial dwell land 60 may be formed at an internal point on the one or more twister pinion teeth 58, such that when the radial dwell land 60 engages the dwell cam 52 a portion of the one or more twister pinion teeth 58 containing the radial dwell land 60 straddles the dwell cam 52. The radial dwell land 60 is configured to slide along the dwell cam 52 and dwell the twister pinion gear 56 relative to the idler gear 36, in accordance with some aspects. The resultant face width of the two twister pinion teeth 58 having the radial dwell land 60 formed therein may be more narrow than the dwell channel 53 allowing said teeth to pass between the dwell cam 52 and the at least one second dwell tooth 48. The radial dwell land 60 may be configured to hold the wire receiving channel 64 in alignment with the wire ejection slot 88 while the twister pinion gear 56 dwells relative to the idler gear 36.

In other aspects, each of the twister pinion teeth 58 may have a face width more narrow than the dwell channel 53 and a dwell cam follower (not shown) may be affixed to the twister pinion gear 56. Said dwell cam follower may be configured to slide along the dwell cam 52 and dwell the twister pinion gear 56 relative to the idler gear 36.

Figure 6:
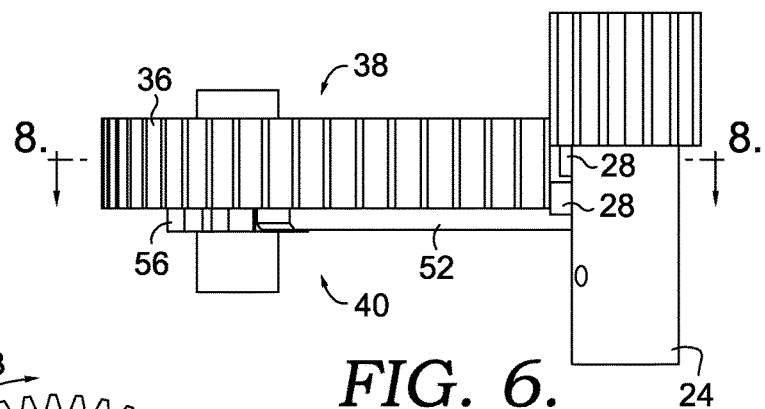
FIG. 6 is a top view of a gear-train, in accordance with an embodiment of the invention.
Figure 7:
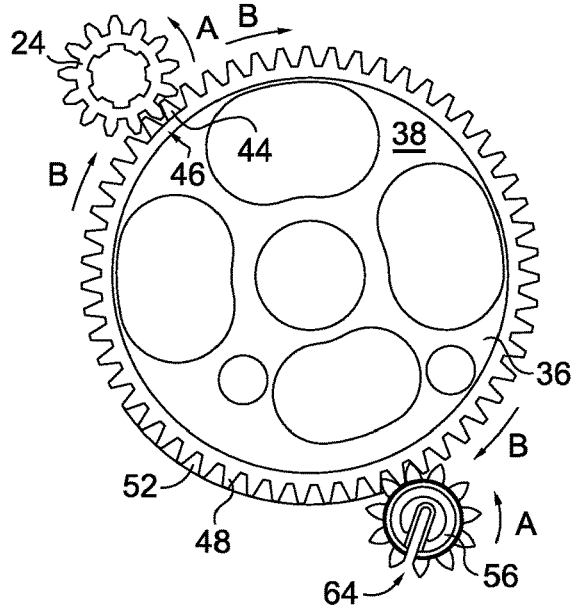
FIG. 7 is a side view of the gear-train of FIG. 6, in accordance with an embodiment of the invention.
Figure 8:
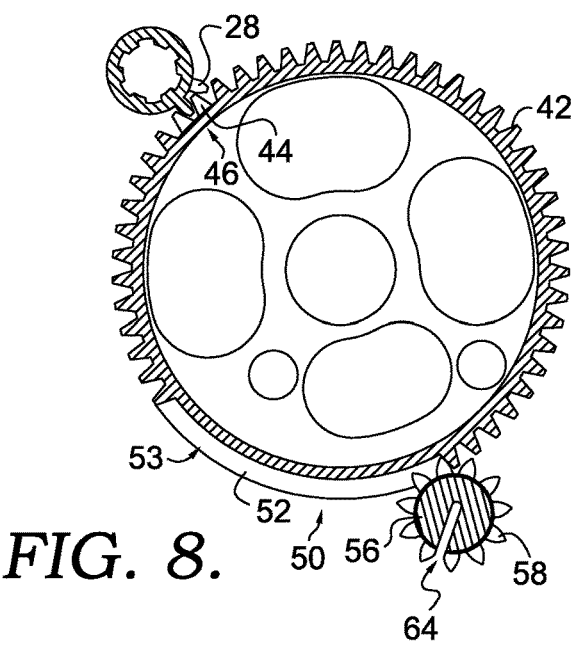
FIG. 8 is a cross-section view taken along cut line 8-8 of the gear-train of FIG. 6, in accordance with an embodiment of the invention.

Referring now to FIGS. 6-9, an exemplary gear-train is depicted having the main-drive gear 24, the idler gear 36, and the twister pinion gear 56. FIGS. 6-8 depict the gear-train in a home position, where FIG. 6 depicts a top view, FIG. 7 depicts a side view, and FIG. 8 depicts a cross-section view of the exemplary gear-train taken across cut line 8-8 in FIG. 6. In the home position, the plurality of main-drive gear teeth 26 are not in mesh with the plurality of the idler gear teeth 42 (as shown in FIG. 14). This results in the gear-train being in a first dwell where the idler gear 36 dwells relative to the main-drive gear 24. The twister pinion gear 56 is in mesh with the idler gear 36 when the gear-train is in the home position. Hence, the twister pinion gear 56 also dwells relative to the main-drive gear 24 when the gear-train is in the home position. The gear-train may recover from the first dwell and begin to turn at the beginning of the wire tying cycle when the at least one dwell recovery tooth 28 engages the at least one first dwell tooth 44.

Figure 9:
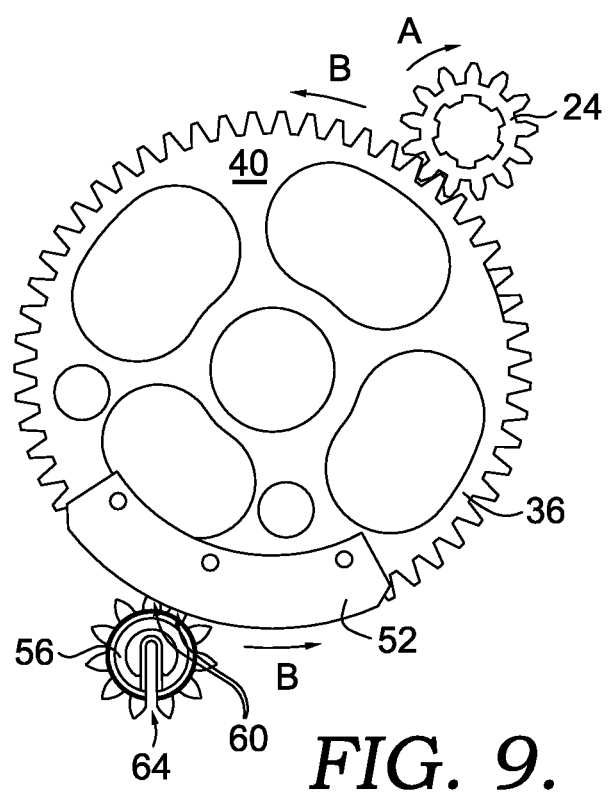
FIG. 9 is a side view of a gear-train, in accordance with an embodiment of the invention.

FIG. 9 depicts the exemplary gear-train in a second dwell where the twister pinion gear 56 dwells relative to the idler gear 36 and the dwell cam 52 of the idler gear 36 is sliding along the radial dwell land 60 of the twister pinion gear 56. The gear-train may recover from the second dwell when an end of the dwell cam 52 slides off of the radial dwell land 60 and the plurality of twister pinion teeth 58 re-engage, and mesh with, the plurality of idler gear teeth 42.

The illustrated gear-train has a mathematical gear ratio of 13:55:11 between the main-drive gear 24, the idler gear 36, and the twister pinion gear 56, respectively. The first dwell and the second dwell of the exemplary gear-train may mechanically cause the gear-train to have a theoretical gear ratio for tying one knot (i.e., completing one wire tying cycle) not directly proportional to the gears. For example, the theoretical gear ratio of the illustrated gear-train is 10.8:55:13.75 between the main-drive gear 24, the idler gear 36, and the twister pinion gear 56, respectively. The theoretical gear ratio of the illustrated gear-train decreased between the main-drive gear 24 and the idler gear 36 from the mathematical gear ratio between such gears because the first dwell causes the main-drive gear 24 to travel a farther distance in one wire tying cycle. Similarly, the theoretical gear ratio of the illustrated gear-train increased between the idler gear 36 and the twister pinion gear 56 from the mathematical gear ratio between such gears because the second dwell causes the twister pinion gear 56 to travel a shorter distance (because it slides around the dwell cam 52) in one wire tying cycle.

Referring now to FIG. 9, once the idler gear 36 has rotated such that the dwell cam 52 is in slidable engagement with the radial dwell land 60 of the twister pinion gear 56, the twister pinion gear 56 may enter a dwell relative to the idler gear 36. While the dwell cam 52 is in slidable engagement with the radial dwell land 60, the main-drive gear 24 will continue to turn in direction A, which drives idler gear 36 in direction B. Meanwhile, the dwell cam 52 slides along the radial dwell land 60 as the idler gear 36 turns. The twister pinion gear 56 may dwell relative to the idler gear 36 in a position that holds the wire receiving channel 64 in alignment with the wire ejection slot 88, such that the tied and cut wire may be ejected from the wire receiving channel 64, in accordance with some aspects. As the twister pinion gear 56 reaches the end of the dwell cam 52, the twister pinion gear 56 may re-engage its mesh with the idler gear 36 and resume turning in direction A. The twister pinion gear 56 may reach the end of the dwell cam 52 near the home position and may therefore only turn in direction A a small amount, but enough such that the wire receiving channel 64 is no longer aligned with the wire ejection slot 88. Once the idler gear 36 reaches the home position, it may re-enter the dwell relative to the main-drive gear 24, which continues to turn in direction A. While the idler gear 36 dwells relative to the main-drive gear 24, the twister pinion gear 56 also does not rotate as it is meshed with the idler gear 36.

Referring to FIGS. 10-12, a perspective view of an exemplary gear-train having the main-drive gear 24, the idler gear 36, and the twister pinion gear 56 is depicted along with several cam pins and cam followers that may perform some of the secondary functions associated with the wire tying cycle. As discussed above, one or more cam pins 70 may be coupled to the idler gear 36. The one or more cam pins 70 may actuate one or more cam followers associated with the secondary functions. For example, one of the one or more cam pins 70 may actuate a door opening cam follower 74 (shown in FIG. 12) to move the door 12 from the closed position to the open position. Further, one of the one or more cam pins 70 may actuate a wire cutting assembly 78 (shown in FIG. 13) to cut the wire, while another of the one of more cam pins 70 may actuate a wire ejector cam follower 68 to eject the wire from the wire receiving channel 64. In some aspects, any combination or all of the door opening cam follower 74, the wire cutting assembly 78, and the wire ejector cam follower 68 may be actuated by a single cam pin 70. In addition, one of the one or more cam pins 70 may comprise a detent locking pin 72 or the detent locking pin 72 may be a separate pin coupled to the idler gear 36. The detent locking pin 72 may be configured to be received by a dog 66 and lock the idler gear 36, and therefore also the twister pinion gear 56, in the home position.

The dog 66 may include a cam lobe follower configured to engage the cam lobe 30 as it turns with the main-drive gear shaft. When actuated by the cam lobe 30, the cam lobe follower releases the detent locking pin 72 from the dog 66 and a new wire tying cycle may begin. The dog 66 may be rotatably coupled to the frame 10 and may be biased to a locking position. The wire ejector cam follower 68 may also be coupled to the frame 10 and may be biased to a withdrawn position that does not obstruct the wire passageway or the wire receiving channel 64. The door opening cam follower 74 may be coupled to the frame 10. In another aspect, the door opening cam follower 74 may be integral to the door 12.

Figure 13:
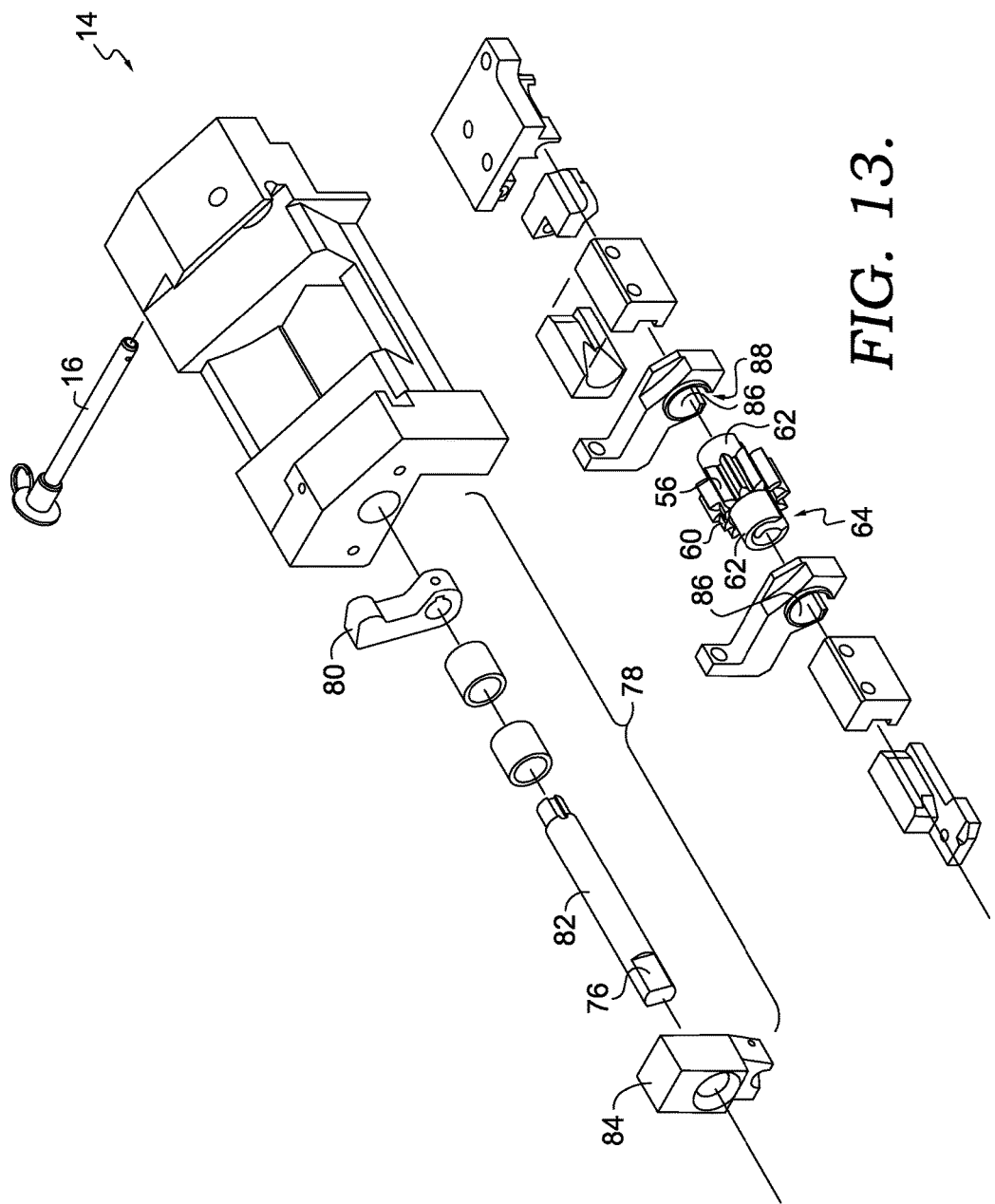
FIG. 13 is an exploded view of a core assembly, in accordance with an embodiment of the invention.

Referring to FIG. 13, the core assembly 14 is depicted in a simplified exploded view. In some aspects, the core assembly 14 may include the twister pinion gear 56. For example, the twister pinion gear arms 62 may be received within bushings 86. The bushings 86 may be contained within the core assembly 14. In other aspects, the bushings 86 may be coupled to the frame 10. In further aspects, the bushings 86 may include a portion of the wire ejection slot 88. In these aspects, the twister pinion gear 56 may be positioned such that the wire receiving channel 64 is unaligned from the portion of the wire ejection slot 88 in the bushings 86 when in the home position. This unalignment may help retain the wire within the wire receiving channel 64.

The core assembly 14 may also include the wire cutting assembly 78. The wire cutting assembly 78 may include a wire cutter cam follower 80. The wire cutter cam follower 80 may be configured to engage one of the one or more cam pins 70. The wire cutting assembly 78 may further include a shaft 82 coupled to the wire cutter cam follower 80 on one end and to a wire cutter 84 on another end. The shaft 82 may transmit rotation from the wire cutter cam follower 80 to the wire cutter 84 causing the wire cutter 84 to cut the wire. The shaft 82 may include a wire cutter manual override 76 that extends external to the core assembly 14 (as shown in FIG. 1). The wire cutter manual override 76 may be used to manually cut a wire if a jam develops in the wire tie assembly 1.

Turning now to FIGS. 15-19, an exemplary wire tying cycle will now be discussed. The exemplary wire tying cycle may begin from the home position depicted in FIG. 15, wherein a wire has been received through the wire receiving channel 64 such that an end of the wire has passed through the wire receiving channel 64 and advanced around the wire guide track and back through the wire receiving channel 64 to a gripper 90 (shown in FIG. 12). The gripper 90 holds the end of the wire and the two segments of wire received in the wire receiving channel 64 may be tied together. The wire receiving slot 64 of the twister pinion gear 56 holding the two segments of wire may be turned such that the wire receiving slot 64 does not align with the wire ejection slot 88 of the core assembly 14 to help retain the two segments of wire.

The exemplary wire tying cycle may begin by the main-drive gear 24 turning in direction A. The cam lobe 30 also turns in a direction A until it reaches a dog cam follower. When locked in the home position, the idler gear 36 dwells relative to the main-drive gear 24. When locked in the home position, the idler gear 36 is in mesh with the twister pinion gear 56 and therefore also does not turn relative to the main-drive gear 24.

Figure 16:
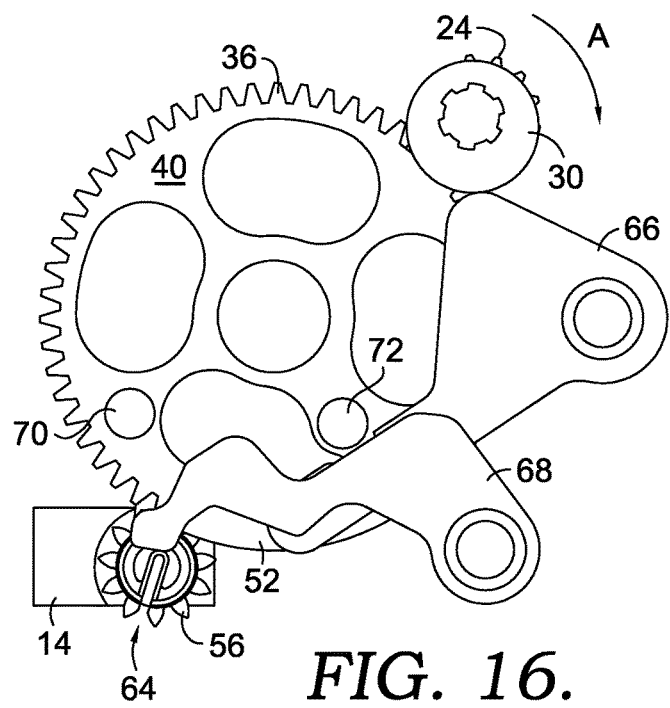
FIG. 16 is a partial side view of a wire tie assembly, in accordance with an embodiment of the invention.

As shown in FIG. 16, the detent locking pin 72 may be released from the dog 66 when the cam lobe 30 actuates the dog cam follower. The cam lobe 30 may actuate the dog cam follower by turning in direction A. For example, the cam lobe 30 may turn 270 degrees. The idler gear 36 still dwells relative to the main-drive gear 24 but is ready to re-engage. For example, the at least one dwell recovery tooth 28 of the main-drive gear 24 may be proximate to the at least one first dwell tooth 44 of the idler gear 36 at the first dwell portion 46. Once engaged, any further turning will start to tie the two segments of wire received in the wire receiving channel 64 of the twister pinion gear 56.

Figure 17:
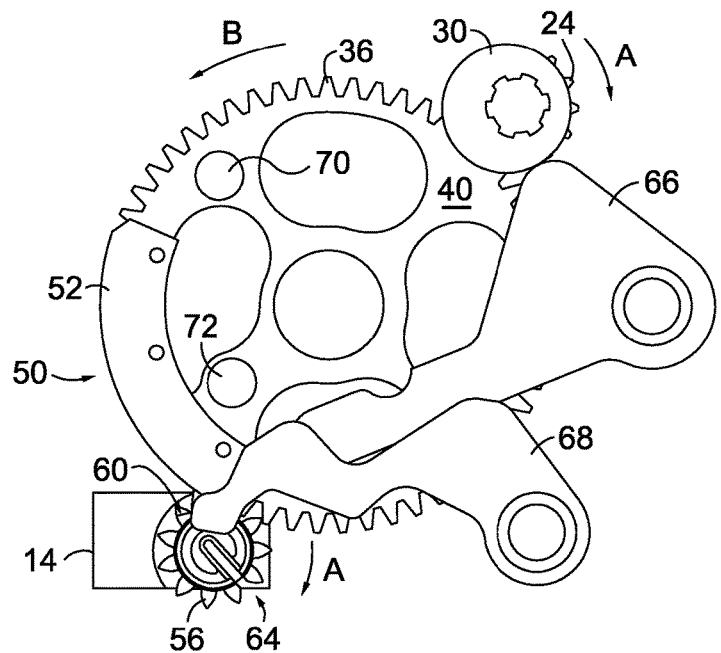
FIG. 17 is a partial side view of a wire tie assembly, in accordance with an embodiment of the invention.

The exemplary wire tying cycle may begin to tie the two wire segments to one another as the main-drive gear 24 re-engages the idler gear 36 and continues to turn in the direction A, causing the idler gear 36 to turn in a direction B and the twister pinion gear to turn in the direction A. As shown in FIG. 17, the exemplary wire tying cycle may continue to tie the two wire segments to one another until the second dwell portion 50 of the idler gear 36 reaches the radial dwell land 60 of the twister pinion gear 56. In some aspects, the wire tying cycle may continue to tie the two segments of wire together until the main-drive gear 24 has made at least three and a quarter turns. In other aspects, the wire tying cycle may continue to tie the two segments of wire together until the twister pinion gear 56 has made at least four turns.

Figure 18:
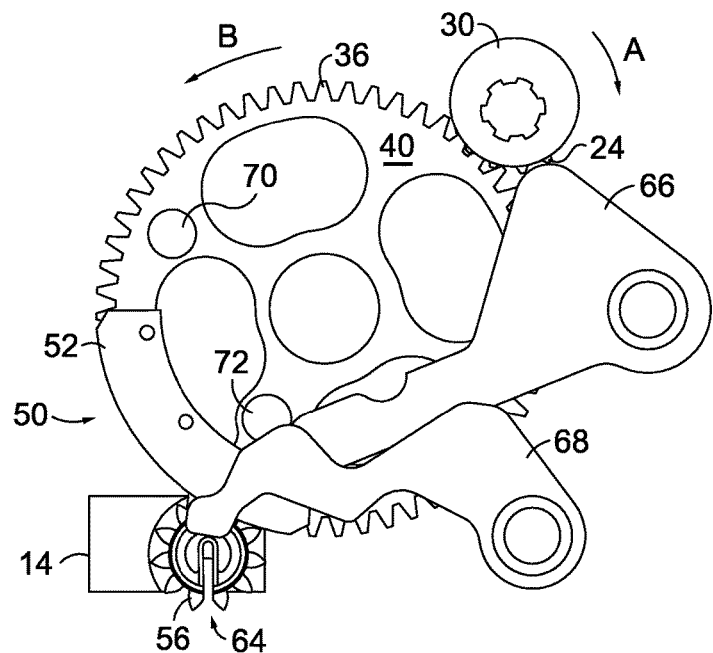
FIG. 18 is a partial side view of a wire tie assembly, in accordance with an embodiment of the invention.

As shown in FIG. 18, once the dwell cam 52 reaches the radial dwell land 60 of the twister pinion gear 56 in the exemplary wire tying cycle, the twister pinion gear 56 dwells relative to the idler gear 36. Hence, the main-drive gear 24 may continue to rotate in the direction A and the idler gear 36 may continue to rotate in the direction B. The twister pinion gear 56 does not rotate, however, until the dwell cam 52 disengages the radial dwell land 60. Instead, the dwell plate 52 of the idler gear 36 slides along the radial dwell land 60 of the twister pinion gear 56. The wire receiving channel 64 of the twister pinion gear 56 may be aligned with the wire ejection slot 88 of the core assembly 14 while the dwell cam 52 is engaged with the dwell land 60.

In some aspects, the idler gear 36 may include the one or more cam pins 70. In other aspects, the detent locking pin 72 may also comprise one of the one or more cam pins 70. While the dwell cam 52 is engaged with the radial dwell land 60, the one or more cam pins 70 may actuate one or more of the secondary functions of the wire tying assembly 1. For example, the one or more cam pins 70 may engage the wire cutter cam follower 80 (shown in FIG. 13) to cut the wire, the door opening cam follower 74 (shown in FIG. 12) to open the door 12 to move the channel cover plate 22 and uncover the wire ejection slot 88, the wire ejector cam follower 68 to eject the wire, or any combination thereof.

In further aspects, after the main-drive gear 24 has made four complete turns, the dwell cam 52 may remain engaged with the radial dwell land 60, the wire ejector cam follower 68 may have finished ejecting the wire, and the cam lobe 30 may have opened the dog 66.

After the wire has been ejected from the wire tying assembly 1 and the twister pinion gear 56 has re-engaged with the idler gear 36, the main-drive gear 24 may turn in the direction A, the idler gear may turn in the direction B, and the twister pinion gear may resume turning in the direction A. In some aspects, the main-drive gear 24 may make less than half a revolution before the wire tying assembly 1 reaches the home position.

Figure 19:
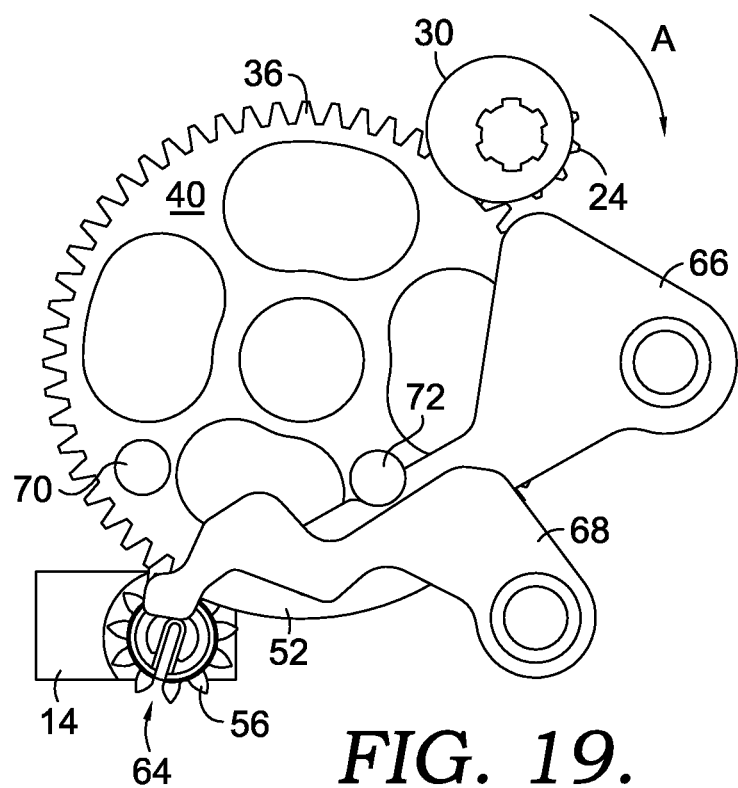
FIG. 19 is a partial side view of a wire tie assembly, in accordance with an embodiment of the invention.

As shown in FIG. 19, once the wire tie assembly 1 reaches the home position, the detent lock pin 72 may be received by the dog 66 to lock the idler gear 36 in position and the main-drive gear 24 is disengaged from the idler gear 36. The twister pinion gear 56 may be turned such that the wire receiving channel 64 is not aligned with the wire ejection slot 88 and the gap is closed. The motor 18 may now be stopped. The motor 18 may turn up to 170 degrees before the cam lobe 30 is ready to engage the cam lob follower and actuate the dog 66 to release the detent locking pin 72. Allowing the motor 18 to turn up to 170 degrees provides an operator with the ability to stop the wire tying assembly 1 before the subsequent wire tying cycle begins.

Figure 20:
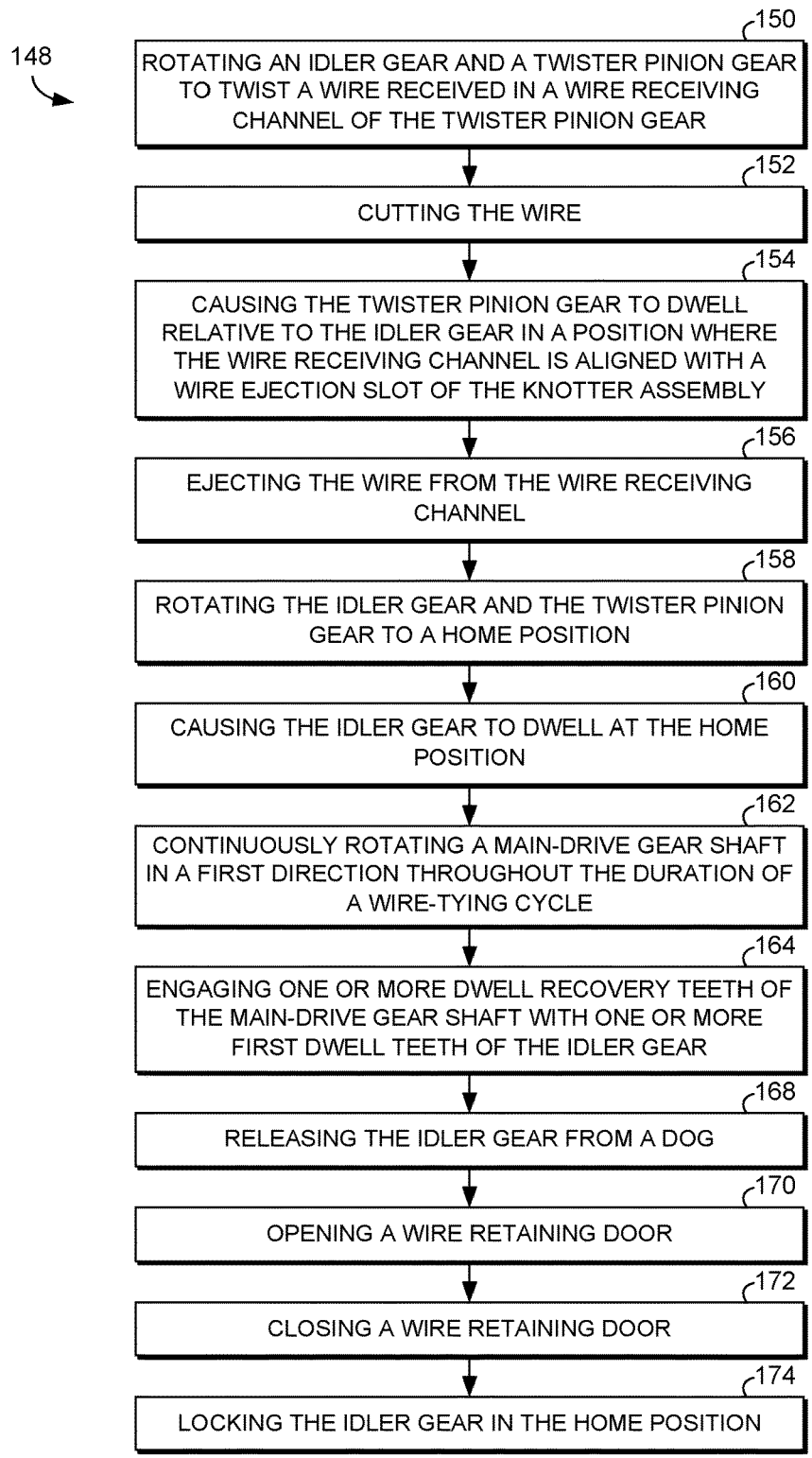
FIG. 20 is a flow diagram of a method of tying a wire positioned around a material to be baled, in accordance with an embodiment of the invention.

Turning to FIG. 20, an exemplary method 148 of tying a wire around a baled material with a wire tie assembly is depicted. The method 148 may include rotating an idler gear and a twister pinion gear to twist a wire received in a wire receiving channel of the twister pinion gear, as depicted in block 150. The method 148 may further include cutting the wire, as depicted in block 152. The method 148 may further include causing the twister pinion gear to dwell relative to the idler gear in a position where the wire receiving channel is aligned with a wire ejection slot of the wire tie assembly, as depicted in block 154. The method 148 may further include ejecting the wire from the wire receiving channel, as depicted in block 156. The method 148 may further include rotating the idler gear and the twister pinion gear to a home position, as depicted in block 158. The method 148 may further include causing the idler gear to dwell at the home position, as depicted in block 160. The method 148 may further include continuously rotating a main-drive gear shaft in a first direction throughout the duration of a wire-tying cycle, as depicted in block 162. The method 148 may further include engaging one or more dwell recovery teeth of the main-drive gear shaft with one or more first dwell teeth of the idler gear, as depicted in block 164. The method 148 may further include releasing the idler gear from a dog, as depicted in block 166. The method 148 may further include opening a wire retaining door, as depicted in block 168. The method 148 may further include closing a wire retaining door, as depicted in block 170. The method 148 may further include locking the idler gear in the home position, as depicted in block 172.

From the foregoing, it will be seen that this invention is one well adapted to attain all the ends and objects hereinabove set forth together with other advantages, which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A gear-train for driving a wire tying assembly, the gear-train comprising:
   a main-drive gear configured to be continuously driven in a first direction throughout the duration of a wire tying cycle;
   an idler gear having a first dwell portion and a second dwell portion, the idler gear being configured to mesh with the main-drive gear during a portion of the wire tying cycle and to dwell relative to the main-drive gear during a portion of the wire tying cycle when the first dwell portion is adjacent to the main-drive gear; and
   a twister pinion gear having a wire receiving channel and configured to be in mesh with the idler gear during a portion of the wire tying cycle and to dwell relative to the idler gear during a portion of the wire tying cycle when the second dwell portion is adjacent to the twister pinion gear.

2. The gear-train of claim 1, wherein the main-drive gear comprises a spur gear shaft, the gear-train further comprising:
   a plurality of spur gear teeth radially extending from a portion of the spur gear shaft; and
   a cam coupled to the spur gear shaft and spaced apart from the plurality of spur gear teeth.

3. The gear-train of claim 2, wherein the cam is configured to release the gear-train from a dog.

4. The gear-train of claim 1 further comprising:
   one or more dwell recovery teeth radially extending from the main drive-gear and configured to re-engage the idler gear when the idler gear enters a dwell relative to the main-drive gear.

5. The gear-train of claim 4, wherein the first dwell portion comprises one or more first gear teeth having a reduced face width that are configured to engage only the one or more dwell recovery teeth of the main-drive gear.

6. The gear-train of claim 1, wherein the main-drive gear is continuously driven by a motor.

7. The gear-train of claim 1 further comprising:
   the twister pinion gear having a plurality of twister pinion gear teeth,
   wherein the second dwell portion comprises one or more second gear teeth having a reduced face width that are configured to permit the twister pinion gear teeth to freely pass beside the one or more second gear teeth.

8. The gear-train of claim 7 further comprising:
   a dwell cam coupled to the idler gear adjacent the second dwell portion and opposite the one or more second gear teeth; and
   the twister pinion gear having one or more dwell teeth configured to slidably engage the dwell cam and cause the twister pinion gear to dwell relative to the idler gear.

9. The gear-train of claim 8 further comprising a radial dwell land formed in the one or more dwell teeth.

10. The gear-train of claim 1 further comprising at least one of:
    a first cam pin coupled to the idler gear and configured to actuate a door during a portion of the wire tying cycle;
    a second cam pin coupled to the idler gear and configured to actuate a wire cutter during a portion of the wire tying cycle;

a third cam pin coupled to the idler gear and configured to actuate a wire ejector during a portion of the wire tying cycle; and a detent pin coupled to the idler gear and configured to be held by a dog to lock the idler gear and twister pinion gear in a home position which is the first dwell portion rotating to a position adjacent the main-drive gear and the twister pinion gear being rotated such that the wire receiving channel is not radially aligned with a wire election slot of the wire tying device.

11. The gear-train of claim 1, wherein the center point of each of the main-drive gear, the idler gear, and the twister pinion gear is linearly aligned.

12. A wire tie assembly for tying a wire positioned around a material to be baled, the wire tie assembly comprising:

a main-drive gear shaft having a plurality of main-drive gear teeth, at least one dwell recovery tooth, and a cam lobe coupled thereto, the main-drive gear shaft being rotatably coupled to a frame;

an idler gear having a plurality of idler teeth, at least one first dwell tooth, at least one second dwell tooth, one or more cam pins, and a dwell cam axially spaced from the at least one second dwell tooth, the idler gear being rotatably coupled to the frame and positioned to mesh with the main-drive gear shaft;

a core assembly coupled to the frame, the core assembly having a twister pinion gear rotatably coupled thereto, the twister pinion gear having a wire receiving slot, a plurality of twister pinion teeth, and a radial dwell land formed in one or more of the twister pinion teeth, the twister pinion gear being positioned to mesh with the idler gear;

and a motor coupled to the main-drive gear shaft and configured to continuously drive the main-drive gear shaft in a first direction throughout the duration of a wire tying cycle.

13. The wire tie assembly of claim 12, wherein a meshing portion of each of the plurality of main-drive gear teeth meshes with the plurality of idler gear teeth, and wherein a face width of the meshing portion is smaller than a face width of the plurality of idler gear teeth.

14. The wire tie assembly of claim 13, wherein the at least one dwell recovery tooth comprises at least one of the plurality of main-drive gear teeth having a meshing portion with a wider face width than the remaining of the plurality of main-drive gear teeth.

15. The wire tie assembly of claim 12, wherein the at least one dwell recovery tooth comprises a gear tooth spaced apart and axially aligned with one of the plurality of main-drive gear teeth.

16. The wire tie assembly of claim 12 further comprising: the frame having one or more of:

a dog coupled to the frame and configured to hold the idler gear and the twister pinion gear in a home position which is the first dwell portion rotating to a position adjacent the main-drive gear and the twister pinion gear being rotated such that the wire receiving channel is not radially aligned with a wire ejection slot of the wire tying device;

a wire ejector cam follower coupled to the frame and configured to eject the wire from the wire receiving slot when the wire ejector cam follower engages at least one of the one or more cam pins;

a wire gripper configured to hold the free end of the wire during a portion of the wire tying cycle;

a door having a cover plate, the door being coupled to the frame and configured to move between an open position and a closed position; and a door opening cam follower configured to move the door from the closed position to the open position during a portion of the wire tying cycle when the door opening cam follower engages at least one of the one or more cam pins.

17. The wire tie assembly of claim 16, wherein the cam lobe actuates the dog to release the idler gear and twister pinion gear from the home position to initiate the wire tying cycle.

18. The wire tie assembly of claim 16, wherein the door is hingedly affixed to the frame such that the door rotates between the open position and the closed position.

19. The wire tie assembly of claim 16, wherein the door is slidably affixed to the core assembly such that the door slides between the open position and the closed position.

20. The wire tie assembly of claim 16, wherein the door is biased to return to the closed position after the one or more cam pins disengages the door opening cam follower.

21. The wire tie assembly of claim 12, wherein a face width of the at least one second dwell tooth is smaller than a face width of the plurality of idler teeth.

22. The wire tie assembly of claim 12, wherein the idler gear has a first side opposite a second side, wherein the at least one second dwell tooth is positioned adjacent to the first side and wherein the dwell cam is positioned adjacent to the second side and is axially aligned with the at least one second dwell tooth.

23. The wire tie assembly of claim 12, wherein the dwell cam and the at least one second dwell tooth define a channel there-between along a channel land of the idler gear, the channel being configured to pass around the plurality of twister pinion teeth as the radial dwell land follows the dwell cam.

24. The wire tie assembly of claim 12 further comprising the core assembly having a wire cutter coupled to a cam follower and configured to cut the wire when the cam follower is engaged by one of the one or more cam pins.

25. The wire tie assembly of claim 12, wherein a face width of the twister pinion teeth is smaller than a face width of the plurality of idler teeth.

26. The wire tie assembly of claim 12 further comprising:
the core assembly having a wire ejection slot,
wherein the radial dwell land is configured to slidably engage the dwell cam while the wire receiving channel is aligned with the wire ejection slot.

* * * * *